J. X. MILLS.
HARROW.
APPLICATION FILED JUNE 17, 1908.

919,053.

Patented Apr. 20, 1909.

Witnesses
J. L. Wright
C. C. Hines

Inventor
Job X. Mills,
By Victor J. Evans,
Attorney

UNITED STATES PATENT OFFICE.

JOB X. MILLS, OF PINE VILLAGE, INDIANA.

HARROW.

No. 919,053.         Specification of Letters Patent.         Patented April 20, 1909.

Application filed June 17, 1908. Serial No. 438,958.

*To all whom it may concern:*

Be it known that I, JOB X. MILLS, a citizen of the United States, residing at Pine Village, in the county of Warren and State of Indiana, have invented new and useful Improvements in Harrows, of which the following is a specification.

This invention relates to an improved construction of harrow designed for general harrowing and also adapted for use in breaking and cutting corn-stalks, cutting sod, clod crushing, ground leveling and other similar operations.

The object of the invention is to provide an implement of this character which is simple, strong and durable in construction, efficient in use, and susceptible of being readily controlled by the driver or operator to regulate its harrowing or crushing action.

The invention consists of the features of construction, combination and arrangement of parts hereinafter fully described and claimed, reference being had to the accompanying drawing, in which:—

Figure 1:
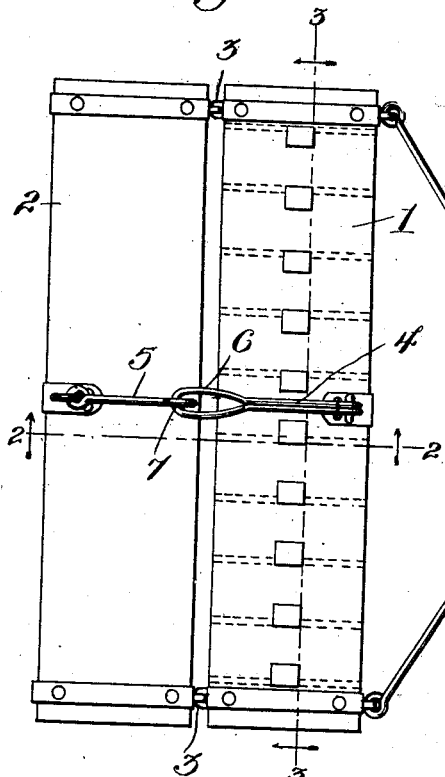
Figure 2:
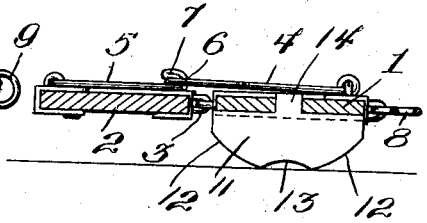
Figure 3:
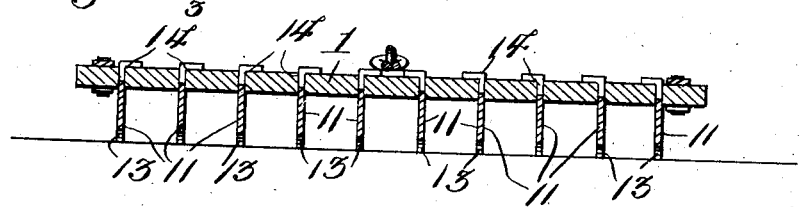
Figure 4:
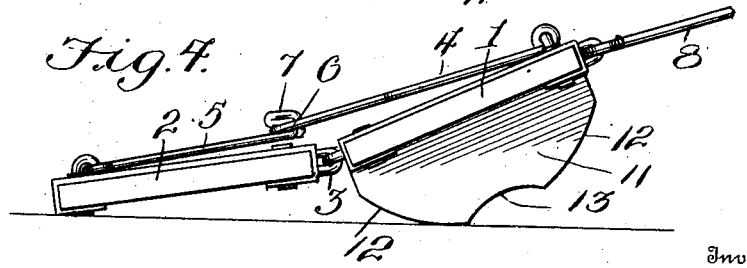

Figure 1 is a top plan view of a harrow embodying my invention. Fig. 2 is a section on line 2—2 of Fig. 1, showing one mode of use of the implement. Fig. 3 is a section on line 3—3 of Fig. 1. Fig. 4 is an end elevation showing another mode of use of the implement.

The device comprises a pair of boards or plates 1 and 2 disposed in parallel relation and one in advance of the other. These boards are pivotally connected at their adjacent edges and near their ends by eyes 3 or their equivalent and are further intermediately connected by interengaging links 4 and 5, pivotally connected, respectively, at their front and rear ends to the respective boards 1 and 2 and detachably connected at their opposite or inner ends. As shown, the link or member 4 is formed with an eye 6 to engage a hook 7 on the member 5 by which the boards or plates are so connected as to permit of a limited pivotal movement thereof and to relieve the pivotal connection 3 of overstrain. The links or members 4 and 5 may be disconnected to permit the boards or plates to be folded one over upon the other for convenience in storage or transportation. The rear board or plate 5 forms a drag for crushing and smoothing purposes, and is also adapted to serve as a seat for the operator.
A draft attachment of any preferred type may be connected with the front board or plate 1, that shown in the present instance comprising outwardly converging rods 8 pivotally connected at their rear ends to the board and coupled at their forward ends by a draft ring or link 9, the rods being intermediately connected and braced by a stay link 10.

The board or plate 1 carries a series of cutter blades 11 extending longitudinally in parallel relation to each other and to the line of draft of the machine. Each of these cutter or harrow blades has its lower edge provided with front and rear convex portions 12 and an intermediate concavity 13 separating the lower ends of the same. The blades may be secured in position in any preferred manner. In the present instance they are illustrated as set at their upper edges in grooves in the underside of the board or plate and provided with central tongues 14 extending upwardly through openings in the board or plate and bent over upon the upper surface thereof.

In operation, the implement is drawn across the field by one or more draft animals, the operator sitting upon the drag board 2 and guiding the animals and controlling the operation of the device. The machine may be employed for general harrowing, cutting corn stalks or sod, clod crushing, ground leveling and other similar purposes, the blades acting to cut the sod or earth or to cut through and partially break up the clods, which are finally engaged and broken by the drag board 2. In general harrowing and grading work the blades loosen up the soil and the drag board crushes, pulverizes and smooths the same, as will be readily understood.

The operator by inclining forwardly or rearwardly or properly disposing his body on the board 2 may cause the apparatus to stand horizontally as in Fig. 2, so as to hold the board 2 elevated and bring both working edges of the blades into play, or to arrange the boards in relatively tilted positions, as in Fig. 4, so that the edges of the convex working surfaces 12 of the blades 11 will rest upon and cut through the soil while the rear edge of the board 2 will act as a drag, the extent of penetration also being controlled by the action of the operator in shifting the weight of his body. Fig. 2 shows the arrangement of the device for simple harrowing, sod cutting and the like, while Fig. 4 shows an arrangement in which the device is rearwardly tilted to bring the rear convex working surfaces of the blades into action and to dispose the rear board to act as a drag for breaking up the clods and smoothing the soil.

From the foregoing description, the construction and mode of operation of my improved harrow will be readily understood, and it will be seen that it provides a simple construction of implement which may be employed for a variety of purposes, which is adapted to be manufactured and sold at a comparatively low cost, and which may be conveniently folded for storage or transportation.

Having thus fully described the invention, what is claimed as new is:—

1. A harrow or like implement comprising pivotally connected front and rear boards, working blades carried by the front board and extending parallel to the line of draft, said blades being provided with front and rear convex working edges, and means connecting the boards for limiting their relative pivotal movement.

2. A harrow or like implement comprising front and rear pivotally connected boards, a draft appliance connected with the front board, and working blades carried by the front board, said blades being disposed in parallel relation longitudinally of the machine and each provided with front and rear convex working edges and an intermediate concavity.

3. A harrow or like implement comprising front and rear pivotally connected boards, rods pivotally connected with the boards and having a detachable connection with each other for limiting the relative pivotal movements of the boards, a draft connection applied to the front board, and a series of working blades on said front board extending in parallel relation to the line of draft and having front and rear convex working surfaces.

In testimony whereof I affix my signature in presence of two witnesses.

JOB X. MILLS.

Witnesses:
JOHN L. OGBORN,
JOHN A. BRYANT.